Nov. 9, 1965     R. E. RAYNER     3,217,193
LIQUID COOLED MOTOR ARRANGEMENT
Filed March 8, 1963

RAYMOND E. RAYNER
INVENTOR.

BY Daniel A. Bobis
Atty

3,217,193
LIQUID COOLED MOTOR ARRANGEMENT
Raymond E. Rayner, Colonia, N.J., assignor to Worthington Corporation, Harrison, N.J., a corporation of Delaware
Filed Mar. 8, 1963, Ser. No. 263,829
12 Claims. (Cl. 310—54)

This invention relates to a novel dynamo-electric machine or electric motor, and particularly to means for the cooling of such machine by pressurized fluid injection.

Cooling of motors for heavy industrial uses has been found to be desirable in many applications. Primarily, with adequate motor cooling it is possible to greatly reduce the physical size of a motor up to about one-half for a given horsepower output. This factor is favorably reflected in initial installation expenditures and in plant layout consideration.

The prior art has suggested motor cooling through use of a gas or air stream passed into contact with hot motor parts. It has also been determined that under limited conditions and with special motor designs, liquid cooling might be employed. In the instance of the latter, a vaporizable liquid is introduced into a hermetic motor casing and permitted to vaporize in contact with heated components. Thereafter, vapors circulate among the motor components and are subsequently drawn from the casing to be condensed and recirculated.

A highly efficient method of achieving rapid cooling of motor parts is by direct wetting of a vaporizable liquid stream against the heated surfaces. Thus, liquid is forcefully injected into a motor hermetic casing preferably in a plurality of streams directed against both moving and stationary components. Direct wetting takes full advantage of the latent heat and vaporization of the liquid and is a highly efficient arrangement resulting in a rapid cooling rate.

While motor cooling by the latter method is desirable, it also embodies certain disadvantages. For example, where a liquid is the cooling medium, impingement of a high velocity jet or stream against a moving part or even against a stationary part of the motor presents the possibility of eventual wear, or damage to the part. Most notably, high velocity liquid streams as used in the prior art entail the drawback of eroding away insulation from wires and coated surfaces thus prompting eventual short circuiting.

In overcoming the above disadvantages related to motor cooling, there is provided a hermetic dynamo-electric machine particularly constructed and adapted to form a fluid flow path through internal components including the stator and rotor. Thus, a vaporizable fluid in both liquid and vapor phase may readily pass into heat exchange contact with heated surfaces. Means is provided cooperative with the motor for introducing a liquid stream of fluid into the casing. Means is also provided within the casing and disposed in the path of said stream for diffusing at least a portion of the cooling fluid into a spiraling path prior to contacting rotating motor parts.

It is therefore an object of the invention to provide an efficiently cooled dynamo-electric machine employing a vaporizable fluid as the cooling medium.

A further object is to provide a hermetic motor construction in which a vaporizable fluid is injected in such manner as to freely circulate throughout motor components in heat exchange relationship therewith.

A still further object of the invention is to provide a dynamo-electric machine construction in which normally hot components are cooled by evaporation resulting from direct wetting by a cooling liquid of the heated components in such manner as to afford a uniform cooling of said components to achieve a minimization of hot spots and points of excessive wear.

Another object of the invention is to provide a liquid cooled hermetic motor adapted to direct high velocity streams of cooling fluid against hot motor surfaces in such manner as to prevent or substantially minimize erosion at said surfaces.

Other objectives of the invention will become clear to one skilled in the art from the following description of the motor and its operation made in conjunction with the following drawings, in which:

Figure 1:
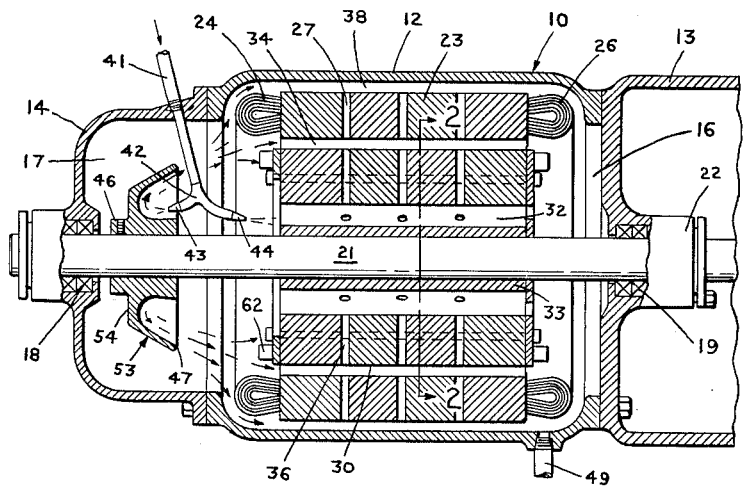
FIGURE 1 is a side elevation in cross-section of a dynamo-electric machine embodying the present liquid injection arrangement.

In brief, the invention contemplates a liquid cooled dynamo-electric machine of the type shown embodying a stator, and rotor, journaled for rotation in a hermetic casing. Conduit means communicated with the casing is connected at one end to a source of pressurized vaporizable fluid external to the machine and provided at the other end with a discharge head directing a plurality of liquid streams. Deflector means disposed within the casing receives at least a portion of the vaporizable fluid flow, and redirects the same into an atomized, swirling, particulated stream coincidental with rotor rotation for contacting rotating parts. A second stream leaving the discharge head is directed into the rotor center passage, vaporizes in part on contact with heated surfaces, and is propelled outwardly through aligned radial passages in both rotor and stator. Collecting means in the casing receives and drains off vapors and liquid for recirculation.

Referring to the drawings, a preferred embodiment of the invention is illustrated generally as incorporated in a hermetic motor drive unit 10 of the type including an outer casing which maintains a vapor tight enclosure about the entire unit. The casing is generally elongated, including a central section 12 having opposed end sections or housings 13 and 14 fastened thereto defining end chambers 16 and 17 respectively. Each end section is provided with means for mounting shaft bearings 18 and 19. At least one end housing 13 includes an axial opening registering motor shaft 21 therethrough for connection to a driven element such as a pump, gear reducer, etc.

The casing is provided with separate connections for introducing a stream of vaporizable fluid, and for evacuating the casing in order that a sufficient pressure differential may be established to induce a flow of cooling liquid through the motor along a desired path. The preferred flow path is arranged to provide the most efficient heat exchange contact between heated motor parts passing vapor. An adequate flow path, and a high wetted surface to mass ratio, forces elimination from the motor of prospective hot spots where cooling might otherwise be minimized. For example, areas not exposed to the cooling stream tend to develop hot spots which could possibly lead to creation of burned or cracked insulation due to a temperature differential with adjacent areas.

The motor casing although shown as being made up of several parts including the assembled central section and opposed end housings, may also be of the welded type embodying a substantial unitary construction. The motor includes a stator 23 made up of adjacently assembled thin laminations normally formed of metal and held together to define a unitary core. The laminations are arranged with intermediate spacers such that on being assembled there are defined one or more passages 27 which extend through the stator permitting the free flow of coolant medium from the coil inner side to the outer surface. Windings 24 and 26 carried on the stator extend laterally from both ends thereof into the respective end chambers 16 and 17.

Stator 23 as shown in FIGURE 1 may be fastened within the casing by a supporting ring or longitudinal bars to be spaced slightly from the casing inner wall. The support means so formed to permit free flow of coolant along the stator outer surface from one end to the other. In normal operation centrifugal force will carry the cooling stream outwardly through passages 27, and longitudinally along passage 38.

Rotor 30 consists of a shaft 21 having at least one end 31 extending through the casing wall and provided with a pair of spaced bearings. Bearing 19 is carried at end housing 13 while bearing 18 is retained at end housing 14. Rotor 30 includes a plurality of energizable rotor bars held directly in contact with shaft 21 or spaced therefrom and mounted on a spider 33 rotatably supported on a shaft.

Use of the spider construction provides an elongated passage 32 extending longitudinally through the motor communicating chambers 16 and 17 to promote a unidirectional flow of coolant liquid. In the instance of smaller sized motors where laminations are carried directly on the shaft, longitudinal passages may be formed as an integral part of the rotor for passing fluid or cooling media from one end to the other.

Under normal operation, in the construction illustrated, vaporizable liquid is introduced at one end of center opening 32 primarily for cooling the inner surfaces of the rotor. Further cooling is achieved at the radial passages 36 and 27 which permit fluid to pass outwardly by centrifugal force either in liquid form or as a mixture of liquid droplets and vapor to enter annular gap 34.

Gap 34 between the adjacent rotor and stator surfaces is sufficiently wide to provide rotational clearance. Radial passages 36 opening into gap 34 are preferably disposed linearly with passages 27 formed in the stator whereby vapor passes to both rotor and the stator prior to entering external passage 38 formed at the stator outer edge.

Liquid is introduced to the hermetic enclosure by a conduit means 41 sealably fixed to the casing by a suitable fluid tight pipe fitting or flange. The outer end of conduit means 41 is communicated with a pressurized source of vaporizable liquid such as the liquid holding condenser or economizer of a refrigeration system.

Conduit means 41 as shown in FIGURE 1 includes a discharge head 42 having a plurality of nozzles 43 and 44 directing streams of coolant in different directions. Nozzle 44 is positioned to direct a first liquid stream into central opening 32. A second nozzle 43 ejects a stream of likuid diametrically opopsite to the first stream and into contact with diffuser plate 53.

Diffuser 53 is rotatably carried within the motor enclosure in such manner as to receive at least a portion of the liquid stream from the high pressure liquid source. The diffuser 53 illustrated in FIGURE 1 includes basically a disc-like plate 54 having a diameter less than the rotor diameter and disposed in end chamber 17. Hub 46 cooperative with plate 54 is rotatably carried on shaft 21. A peripheral lip 47 at the outer edge of plate 54 extends in a direction toward the rotor end windings. Vanes or similar impelling means may be provided on the diffuser face to fling liquid outwardly toward lip 47.

Diffuser 53 is sufficiently spaced from the rotor and stator end faces such that it is possible to introduce a stream of coolant against the inner surface of the diffuser permitting centrifugal force to propel the liquid outwardly, and diffuse the same. The resulting flow leaving lip 47 is a conical spiraling stream of minute liquid droplets which are preferably directed into the gap 34 or which impinge against the rotating end face of the rotor.

While diffuser 54 is shown as embodied in a particular arrangement, other embodiments of this element and their disposition along shaft 21 may be provided to afford a necessary dispersion of liquid into an atomized conically formed spray.

Figure 3:
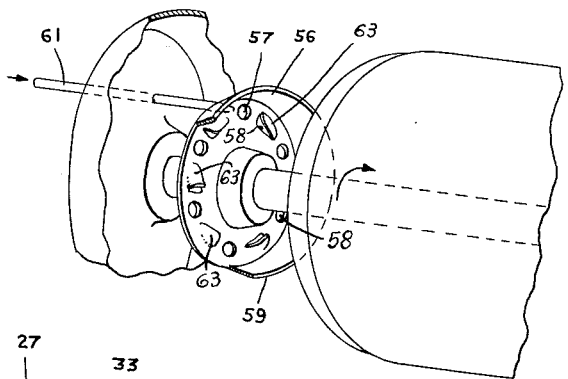
FIGURE 3 is a segmentary view on an enlarged scale showing an alternate embodiment of the invention.
Figure 2:
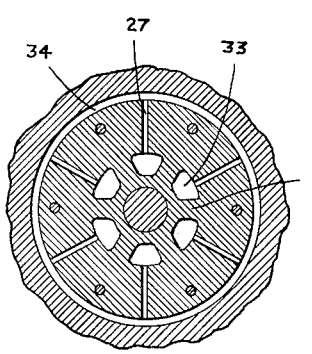
FIGURE 2 is a segmentary view in cross-section taken along line 2—2 of FIGURE 1.

For example, as shown in FIGURE 3, the rotating deflector 56 may be so formed and arranged on the rotor shaft to receive liquid at its back surface. A liquid injector 61 impinges a stream of liquid in a direction toward the rotor central opening. Primary openings 57 permit entry of a proportional amount of liquid coolant which enters into the rotor center passage. The remainder of the liquid passes through secondary openings 58 equipped with vanes or baffles 63 for redirecting the stream outwardly toward 59 thus forming a swirling stream of the droplets.

Referring again to FIGURE 1, lip 47 essentially affords a guide for directing the dispersed liquid stream against the rotor end face and generally toward gap 34. Normally, with the diffuser adfixed to and rotating at the same rate as shaft 21, liquid coolant slung radially from the diffuser lip is provided with an initial velocity substantially equal to the rotational velocity of the motor. Thus, minute droplets will impinge against the rotor end nearest the diffuser with only a slight decrease in angular velocity thereby substantially avoiding erosion to insulation on the rotating member.

To provide maximum coverage of rotor face, the diffuser outer lip may be so shaped to direct liquid in any desired direction. Thus, the lip may be vaned or scalloped or otherwise provided with deflecting means to achieve the desired configuration of cooling stream.

It is readily seen that the cooperative function of the motor with the fluid introducing means accomplishes two purposes. Primarily, the liquid stream is provided with a swirling motion having a terminal velocity approximating the rotational velocity of the rotor. Secondly, the introduced liquid stream is diffused into a plurality of small droplets.

As vapor and liquid accumulate in discharge chamber 16, said chamber being maintained at a substantially lower pressure than the inlet chamber 17 will cause vapor to be drawn to the discharge outlet 49 to be circulated in the system to be again used. When the entire system, including the hermetic casing, constitutes a closed refrigeration circuit, vapor drawn through casing discharge 49 will be directed to a compressor suction to be recompressed, or directed into the low pressure evaporator.

Although the diffuser presently shown is rotatably carried on one end of the motor shaft, cooling could also be achieved by the use of a second diffuser. The latter could readily be carried on the shaft other end so that coolant liquid is simultaneously directed from both ends of the motor toward the central part of the rotor. With this latter arrangement, the casing and stator are modified to locate the discharge passage most conveniently to accommodate the dual flow.

Also, while the diffuser 54 is shown and described as being carried on rotor shaft 21, it could also be incorporated into and be made an integral part of the rotor core such as being integral with the rotor cooling vanes 62.

While the invention is described with relation to a dynamo-electric machine, having a particular arrangement of stator and rotor, it is not intended that the concept of the coolant's diffuser be so limited to this type of machine or actually this type of diffuser. The novel coolant injection and dispersion arrangement could also be employed in other dynamo-electric machines such as motor generator sets and the like.

It is readily appreciated by one skilled in the art that certain modifications and changes may be made in the disposition and the arrangement of the parts herein described without departing from the spirit and scope of the invention.

What is claimed is:

1. A liquid cooled dynamo-electric machine including a stator and a rotor journaled for rotation within the stator, a hermetic casing defining an enclosure surrounding the machine and having an outlet for evacuating fluid therefrom:
   (a) conduit means connected to a pressurized source of vaporizable cooling liquid for injecting a high velocity stream of said liquid in a direction toward motor heated surfaces and in a direction away from the motor heated surfaces,
   (b) a diffuser means positioned in said hermetic casing enclosure on one side of the stator and the rotor and adapted to receive the portion of said high velocity cooling liquid stream directed away from the motor heated surfaces,
   (c) said diffuser being arranged to redirect the received portion of the stream into a swirling stream of liquid droplets and to impinge particles of the swirling stream against heated rotor surfaces.

2. A liquid cooled dynamo-electric machine including a stator, a rotor having a shaft journaled for rotation within the stator and defining an annular gap between adjacent stator and rotor surfaces, said machine being enclosed in a hermetic casing having an outlet means for evacuating fluid therefrom:
   (a) conduit means connected to a pressurized source of vaporizable cooling liquid and having a discharge head injecting a stream of said liquid toward heated surfaces of the machine,
   (b) a nozzle carried in the discharge head of said conduit means directing at least a portion of the vaporizable liquid stream against the surfaces of non-rotating components of said machine,
   (c) a diffuser means positioned in the hermetic casing to receive the remainder of the liquid stream from the conduit means discharge head,
   (d) said diffuser being arranged to form the received liquid into a swirling stream having a rotary motion substantially coincidental with rotation of said rotor to impinge swirling liquid droplets against heated surfaces thereof.

3. In a liquid cooled dynamo-electric machine substantially as defined in claim 2 wherein the diffuser means is cooperatively associated with the rotor to be rotated thereby.

4. In a liquid cooled dynamo-electric machine substantially as defined in claim 2 wherein said diffuser means comprises a member carried on the rotor shaft adjacent at least one end face of the rotor, thereby directing a swirling stream of liquid droplets against said rotor end face.

5. In a liquid cooled hermetic motor including a stator, a rotor having a shaft mounted for rotation in the stator and means forming a chamber adjacent said shaft, a hermetic casing providing an enclosure about said motor and defining opposed end chambers:
   (a) first conduit means connected to a source of vaporizable liquid and communicated with at least one of said end chambers directing a high velocity stream of the vaporizable liquid thereto,
   (b) a diffuser means carried on the rotor and having a face positioned to receive a portion of the high velocity liquid stream from said first conduit means,
   (c) said diffuser means face including a central portion having a peripheral lip at the outer edge thereof,
   (d) said peripheral lip being biased in a direction toward the rotor end face for delivering a spiraling stream of vaporizable liquid toward heated rotor surfaces, and
   (e) second conduit means in communication with the hermetic casing withdrawing fluid in both liquid and vapor phase therefrom.

6. In a liquid cooled hermetic motor substantially as defined in claim 5 wherein the diffuser means includes a plurality of vanes on the diffuser face disposed to receive a liquid stream from the first conduit means and to direct said stream toward the peripheral lip.

7. In a liquid cooled motor substantially as defined in claim 5 wherein the diffuser means is positioned in one of said end chambers intermediate the rotor end surface and the first conduit means respectively, said diffuser means including openings therethrough located in substantial alignment with the first conduit means passing a stream of liquid from the first injector into the rotor chamber.

8. In a liquid cooled motor substantially as defined in claim 5 wherein the diffuser means is carried on the rotor shaft adjacent the rotor face.

9. A liquid cooled electrical apparatus including a casing forming a hermetic enclosure:
   (a) a stator positioned in the casing defining opposed end chambers in said enclosure and being inwardly spaced from the casing wall to form an outer passage communicating the respective opposed end chambers,
   (b) a rotor journaled in the casing and cooperative with the stator defining an annular gap therebetween,
   (c) said rotor having a shaft including means forming a central chamber about the shaft having at least one open end,
   (d) said stator and rotor having radial passages formed therein communicating said central chamber with the annular gap and outer passages respectively,
   (e) injector means in at least one of said end chambers connected to a source of pressurized vaporizable liquid and positioned to direct a first stream of said liquid into the rotor central chamber whereby rotation of said chamber will urge the liquid into the radial rotor and stator passages.
   (f) a diffuser means rotatably carried on the rotor shaft in said one end chamber and cooperative with the injector means in said chamber to receive a second stream of liquid therefrom,
   (g) said diffuser means being so formed that rotation thereof will urge said second stream of liquid into a spiral flow of liquid droplets directed towards the rotating end surfaces of said rotor and towards said annular gap respectively whereby liquid droplets on contacting heated portions of the rotor and stator will be vaporized,
   (h) and means in the other of said end chambers to evacuate liquid and vapor from the casing.

10. A method for cooling hermetic electric motors by vaporization of a fluid brought into contact with hot motor surfaces which includes the steps of:
    (a) introducing a pressurized stream of the vaporizable liquid to the casing of the hermetic motor,
    (b) forming at least a portion of the pressurized liquid into a particulated stream having a rotational velocity in the direction of the rotor rotation,
    (c) directing said stream toward rotating surfaces of the motor to impinge the stream against heated motor surfaces for cooling the latter by evaporation of the liquid.

11. A method for cooling hermetic electric motors by vaporization of a fluid brought into contact with heated motor surfaces which includes the steps of:
    (a) introducing into at least one end of said hermetic motor a pressurized stream of vaporizable liquid,
    (b) forming at least a portion of the liquid into a particulated stream having a rotational velocity substantially coincidental with the rotational velocity of motor parts,
    (c) directing said particulated stream toward rotating surfaces of the motor to impinge said stream against heated surfaces for cooling the latter by vaporization of the liquid.

12. A method for uniformly cooling hermetic electric motors by vaporization of a fluid brought into contact with heated rotating and non-rotating motor surfaces which includes the steps of:

(a) introducing into at least one end of said hermetic motor a stream of vaporizable liquid, (b) directing a first portion of said stream into contact with non-rotating components of the motor, (c) forming a second portion of the liquid stream into a spiral stream having a rotational velocity substantially coincidental to the rotational velocity of the rotor motor, and (d) directing said spiral stream toward rotating surfaces of the motor to impinge said stream against heated rotating surfaces for evaporation of the liquid against said rotating surfaces.

References Cited by the Examiner

UNITED STATES PATENTS 3,158,009  11/64  Rayner _____ 310—54

ORIS L. RADER, *Primary Examiner.*